US010812434B2

(12) United States Patent
Spencer et al.

(10) Patent No.: US 10,812,434 B2
(45) Date of Patent: Oct. 20, 2020

(54) APPARATUS AND METHOD FOR MAINTAINING MESSAGE DATABASES IN EVENTUAL CONSISTENCY DISTRIBUTED DATABASE SYSTEMS

(71) Applicant: BlackBerry Limited, Waterloo (CA)

(72) Inventors: Bradford Lawrence Spencer, Hammonds Plains (CA); Janet Kori Maccara, Fall River (CA); Shiladitya Sircar, Ottawa (CA); Boris Rozinov, Richmond Hill (CA); Marc-Andre Vachon, Ottawa (CA)

(73) Assignee: BlackBerry Limited, Waterloo (CA)

( * ) Notice: Subject to any disclaimer, the term of this patent is extended or adjusted under 35 U.S.C. 154(b) by 381 days.

(21) Appl. No.: 15/467,865

(22) Filed: Mar. 23, 2017

(65) Prior Publication Data

US 2018/0278566 A1 Sep. 27, 2018

(51) Int. Cl.
*H04L 12/58* (2006.01)
*H04L 12/26* (2006.01)
(Continued)

(52) U.S. Cl.
CPC .............. *H04L 51/24* (2013.01); *G06F 16/27* (2019.01); *G06F 16/275* (2019.01);
(Continued)

(58) Field of Classification Search
CPC ..... H04L 49/103; H04L 43/106; H04L 63/10; G06F 15/16; G06F 11/3058; G06F 9/546
(Continued)

(56) References Cited

U.S. PATENT DOCUMENTS

| 5,734,903 A | * | 3/1998 | Saulpaugh | .............. G06F 9/465 |
| | | | | 709/238 |
| 7,814,149 B1 | * | 10/2010 | Stringham | .......... G06F 16/1748 |
| | | | | 709/203 |

(Continued)

FOREIGN PATENT DOCUMENTS

EP 2584479 A1 4/2013

OTHER PUBLICATIONS

International Patent Application No. PCT/CA2018/050350, International Search Report and Written Opinion dated Jun. 5, 2018.
(Continued)

*Primary Examiner* — Tesfay Yohannes
(74) *Attorney, Agent, or Firm* — Borden Ladner Gervais LLP; Todd Keeler (57) ABSTRACT

A method and electronic device are provided for maintaining a message store having a plurality of messages includes maintaining at the electronic device a client bookmark indicating a point in the message store up to which the content of the message store maintained at the electronic device is known to be complete, and a maximum message identifier (ID) indicating the largest message identifier of the plurality of messages of the message store that the electronic device has received, sending to a server a sync request message for the message store, the sync request message including the client bookmark in response to determining at least one of the client bookmark and the maximum message ID do not match, and the electronic device connecting with the server after a period of being disconnected.

20 Claims, 8 Drawing Sheets

(51) Int. Cl.
　　*G06F 16/27*　　(2019.01)
　　*H04L 12/911*　　(2013.01)
　　*H04L 29/08*　　(2006.01)
　　*H04L 29/06*　　(2006.01)

(52) U.S. Cl.
　　CPC .......... *H04L 43/106* (2013.01); *H04L 47/822* (2013.01); *H04L 51/22* (2013.01); *H04L 67/1095* (2013.01); *H04L 67/42* (2013.01)

(58) Field of Classification Search
　　USPC .................................................. 709/203, 206
　　See application file for complete search history.

(56) References Cited

U.S. PATENT DOCUMENTS

| | | | |
|---|---|---|---|
| 8,676,273 B1* | 3/2014 | Fujisaki | H04M 1/6505 455/567 |
| 2004/0133643 A1 | 7/2004 | Warren et al. | |
| 2005/0138310 A1 | 6/2005 | Horiuchi | |
| 2005/0267980 A1 | 12/2005 | Warren et al. | |
| 2008/0288659 A1 | 11/2008 | Hasha et al. | |
| 2015/0026124 A1 | 1/2015 | Freedman | |
| 2016/0255139 A1* | 9/2016 | Rathod | H04L 67/10 709/203 |
| 2017/0085648 A1* | 3/2017 | Aw | G08B 13/19656 |
| 2017/0195377 A1* | 7/2017 | Ahmed | H04L 65/403 |
| 2017/0331670 A1* | 11/2017 | Parkvall | H04W 52/0229 |
| 2018/0278566 A1* | 9/2018 | Spencer | G06F 16/27 |
| 2018/0315323 A1* | 11/2018 | Winkler | G08G 5/0013 |

OTHER PUBLICATIONS

European Patent Application No. 18770823.5, Extended European Search Report dated Dec. 16, 2019.

International Patent Application No. PCT/CA2018/050350, International Preliminary Report on Patentability dated Oct. 3, 2019.

* cited by examiner

APPARATUS AND METHOD FOR MAINTAINING MESSAGE DATABASES IN EVENTUAL CONSISTENCY DISTRIBUTED DATABASE SYSTEMS

FIELD

The present disclosure relates maintaining message databases in eventual consistency distributed database systems.

BACKGROUND

Distributed computing systems are generally systems in which various components of the system are distributed logically and geographically throughout networked computers that communicate and coordinate their actions by passing messages.

One example of a distributed database system is a system for providing messaging services in which messages from distributed senders are delivered to distributed receivers over the distributed system. Messages get posted to message stores that are maintained in the distributed database system and clients sync the stored content to their local memory for local display. Posted messages need to be delivered quickly and reliably to online clients and also reliably to clients that come back online after being offline when a message was posted, or clients that are intermittently online and offline because of, for example, a poor connection. A client connects to the distributed database system via a server node. At any given time, the server node that a client is connected does not know which, if any, messages of a particular message store are in flight, so that server node can't guarantee the client a complete picture of the most recent messages in the message store. Waiting for the system to reach a consistent state, also referred to as a global quorum, before delivering messages would prevent timely delivery of messages to the clients. However, improving the speed at which the distributed database system reaches a global quorum becomes very expensive as the scale of a distributed database system becomes large, such as the distributed database systems utilized to provide instant messaging services over a large geographical region.

Improvements in maintaining message databases in eventual consistency distributed computing systems are desirable.

BRIEF DESCRIPTION OF THE DRAWINGS

Embodiments of the present disclosure will now be described, by way of example only, with reference to the attached drawings in which.

DETAILED DESCRIPTION

A method and electronic device are provided for maintaining a message store having a plurality of messages includes maintaining at the electronic device a client bookmark indicating a point in the message store up to which the content of the message store maintained at the electronic device is known to be complete, and a maximum message ID indicating the largest message identifier of the plurality of messages of the message store that the electronic device has received, sending to a server a sync request message for the message store, the sync request message including the client bookmark in response to determining at least one of the client bookmark and the maximum message ID do not match, and the electronic device connecting with the server after a period of being disconnected.

Embodiments of the present disclosure relate to improving the efficiency, speed, and reliability of delivering messages from distributed senders to distributed receivers through a geographically and logically distributed system that utilizes an eventual consistency data storage system and that has inherent message racing conditions and imperfect knowledge of the global state of the database.

In order to make message delivery more efficient and quicker, clients maintain a local confidence point, or bookmark, for each message store that the client subscribes to. The client's bookmark that indicates a point in the message store maintained at the client up to which point the client has confidence that the message store is complete. By sharing with the server the client's bookmark during sync requests sent to the server, and by having the server share its confidence bookmark with the client during messaging sent to the client, the client is able to move its bookmark forward, enabling the client to request further messages more efficiently.

In an embodiment, the present disclosure provides a method for maintaining a message store having a plurality of messages that includes maintaining at the electronic device a client bookmark indicating a point in the message store up to which the content of the message store maintained at the electronic device is known to be complete, and a maximum message identifiers (IDs) indicating the largest message ID of the plurality of messages of the message store that the electronic device has received, sending to a server a sync request message for the message store, the sync request message including the client bookmark in response to determining at least one of the client bookmark and the maximum message ID do not match, and the electronic device connecting with the server after a period of being disconnected.

In an example embodiment, the method includes receiving, from the server, a sync response including a server bookmark indicating a point in a message store maintained at the server up to which the content of the message store maintained at the server is known to be complete, message IDs of messages of the message store that come after the client bookmark and before or up to the server bookmark.

In an example embodiment, the sync request message includes the maximum message ID when the sync request is sent in response to the electronic device connecting with the server after a period of being disconnected, and the sync response includes the message IDs of messages in the message store that are up to and including the maximum message ID.

In an example embodiment, when the message store maintained at the server includes a message that follows the message associated with the maximum message ID, the sync response includes a message ID of the message that follows the message associated with the maximum message ID as a next message ID to notify the client that further messages may be requested from the server.

In an example embodiment, the method includes in response to determining that any of the message IDs included in the sync response are associated with messages that the electronic device has not received, sending to the server a pull request that includes the message IDs associated with the determined messages that the electronic device has not received, and receiving from the server the messages associated with the message IDs included in the pull request.

In an example embodiment, the pull request requests a range of message IDs that begins with a smallest message ID of the messages that the electronic device has not received and ends with the message maximum value.

In an example embodiment, the method includes, after receiving the messages associated with the message IDs included in the pull request, the electronic device updating the client bookmark to be equal to the lesser of the server bookmark and the largest message ID of the received messages.

In an example embodiment, the method includes waiting a delay time period between determining that the client bookmark does not match the maximum message ID and sending the sync request message.

In an example embodiment, the delay time period has a length received from the server.

In an example embodiment, the delay time period is based on historic measurements of a time for the server to reach eventual consistency.

In an example embodiment, the method includes determining that the client bookmark is less than a server bookmark received from the server and that the electronic device has received a message having a message ID greater than the client bookmark and less than or equal to the server bookmark, and in response to determining that the client bookmark is less than the server bookmark and that the electronic device has received a message having a message ID greater than the client bookmark and less than or equal to the server bookmark, setting the delay time period to zero.

In an example embodiment, maintaining the client bookmark includes maintaining a timestamp associated with the client bookmark, the method includes in response to determining that a refresh time period has elapsed since the timestamp, sending to the server the sync request message for the message store, the sync request message including the client bookmark.

In another embodiment, the present disclosure provides an electronic device for maintaining a message store having a plurality of messages includes a memory, a processor in communication with the memory, the processor configured to maintain at the memory a client bookmark indicating a point in the message store up to which the content of the message store maintained in the memory is known to be complete, and a maximum message ID indicating the largest message ID of the plurality of messages of the message store that the electronic device has received, send to a server a sync request message for the message store, the sync request message including the client bookmark in response to determining at least one of the client bookmark and the maximum message ID do not match, and the electronic device connecting with the server after a period of being disconnected.

In another embodiment, the present disclosure provides a method for a server of a distributed database to maintain a message store having a plurality of messages that includes maintaining at the server a server bookmark indicating a point in the message store up to which the content of the message store stored in the distributed database is known by the server to be complete, receiving a sync request from an electronic device the sync request message including a client bookmark indicating a point in a message store maintained at the electronic device up to which the content of the message store maintained at the electronic device is known to be complete, and in response to receiving the sync request, sending to the electronic device a sync response including the server bookmark; and message IDs of messages of the message store that are after the client bookmark and up to and including the server bookmark.

In an example embodiment, the sync request message includes the maximum message ID, and wherein the message IDs included in the sync response do not exceed the maximum message ID.

In an example embodiment, when the message store maintained at the server includes a message that follows the message associated with the maximum message ID, the sync response includes a message ID of the message that follows the message associated with the maximum message ID as a next message ID to notify the client that further messages may be requested from the server.

In an example embodiment, the method includes sending to the electronic device a delay time period value that the electronic device waits between the electronic device determining that the client bookmark does not match a maximum message ID and sending the sync request message.

In an example embodiment, the delay time period is based on historic measurements of a time for the server to reach eventual consistency.

In another embodiment, the present disclosure provides a server for maintaining a message store having a plurality of messages in a distributed database that includes a memory, and a processor in communication with the memory, the processor configured to maintain at the memory a server bookmark indicating a point in the message store up to which the content of the message store stored in distributed database is known by the server to be complete, receive a sync request from an electronic device the sync request message including a client bookmark indicating a point in a message store maintained at the electronic device up to which the content of the message store maintained at the electronic device is known to be complete, and in response to receiving the sync request, send to the electronic device a sync response including the server bookmark, and message IDs of messages of the message store that are after the client bookmark and up to and including the server bookmark.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Figure 1:
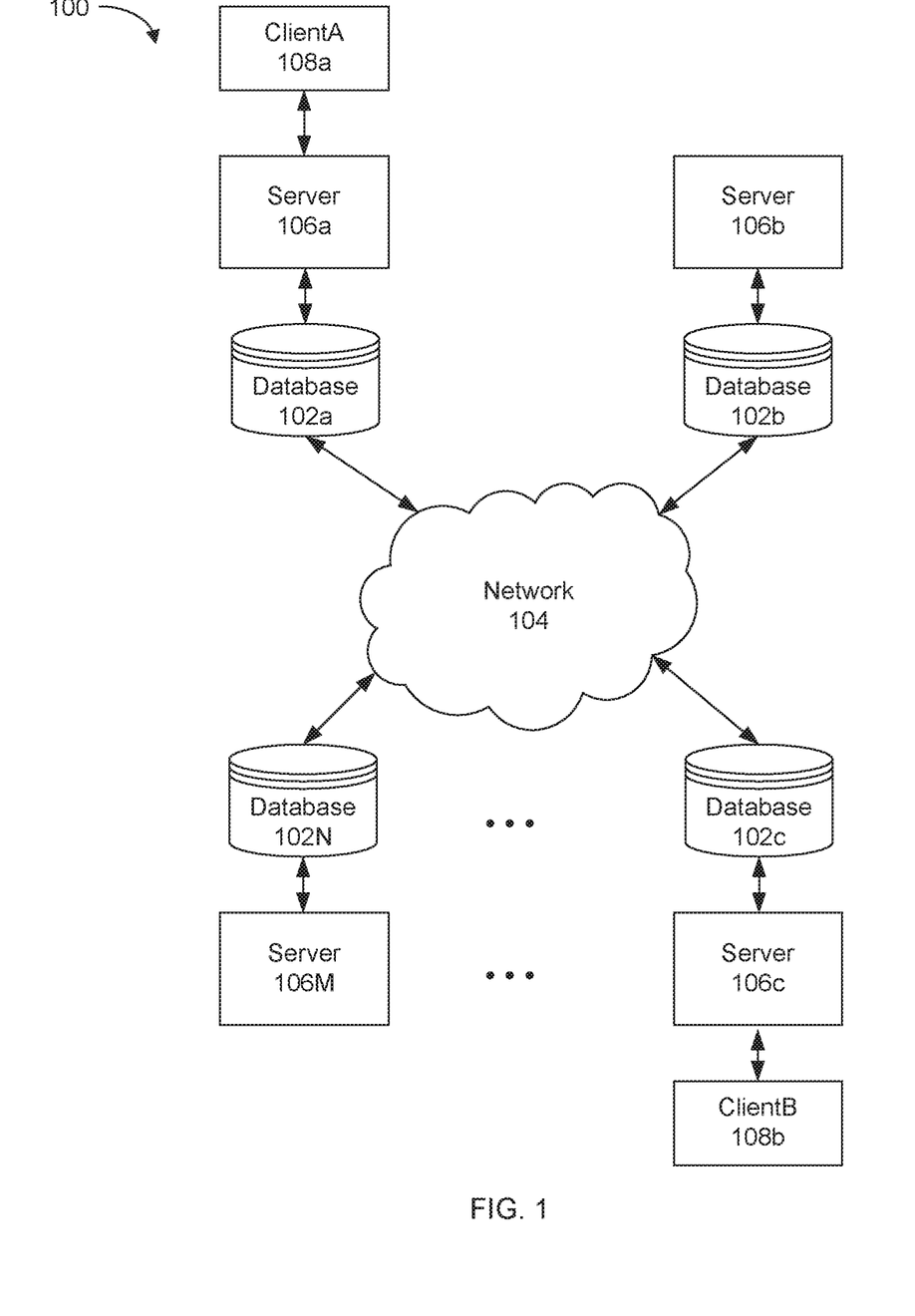
FIG. 1 shows a schematic representation of an example distributed database system according to the present disclosure.

FIG. 1 shows a schematic diagram illustrating an example distributed database system 100. The distributed database system 100 includes a plurality of databases 102a-102N, where N is the number of databases in the distributed database system 100. Each of the databases 102a-102N communicates with each of the other databases 102a-102N to form a mesh of databases. The databases 102a-102N may communicate with each other via a network 104. The network 104 may be any suitable network for providing communication between the various components of the distributed database system 100. For example, the network 104 may be any one of a suitable wired network or wireless network, or combination of wired and wireless networks.

The distributed database system 100 also includes a plurality of servers 106a-106M, where M is the number of servers in the distributed database system 100. The severs 106a-106M may utilizing any suitable protocol for sending and receiving messages including, for example, Session Initiation Protocol (SIP), Session Description Protocol (SDP), Real-time Transport Protocol (RTP), and Secure Real-time Transport Protocol (SRTP). Although not shown in the schematic diagram shown in FIG. 1, each of the servers 106a-106M is connected to each of the other servers 106a-106M in order to form a mesh. The servers 106a-106M may be connected together in any suitable way by wired or wireless connections or networks, or combinations thereof. Each server 106a-106M is connected to at least one of the databases 102a-102N. Although the example shown in FIG. 1 shows each server 106a-106M connected to a single one of the databases 102a-102N, it may be desirable to have each server 106a-106M connected to two or more of the databases 102a-102N in order to increase the number of redundant pathways between all of the databases 102a-102N and the servers 106a-106M. The databases 102a-102N and the servers 106a-106M may be distributed geographically such that different databases 102a-102N and servers 106a-106M may be located in different regions of the world.

Typically clients 108 access information stored in the distributed database system 100 by connecting to one of the servers 106a-106M. The clients 108 may be any suitable electronic device that is able to establish a connection with another device, a server, or other systems. Each client 108 may each be any one of, for example, a desktop computer, a mobile computing device such as a notebook, a laptop computer, a handheld computer, a mobile phone, a smart phone, a personal digital assistant. The clients 108 may connect to servers 106a-106M by any suitable wired or wireless connection.

The illustrative example shown in FIG. 1 includes a clientA 108a connected to SIP node 106a and a clientB 108b connected to SIP node C 106c. In practice, however, many clients 108 may be connected to any of one of the servers 106a-106M.

The distributed database system 100 may be utilized for any application in which in situations in which the sequence of the messages that are posted by the clients 108 is important, and in which messages may be received in quick succession. Typically, messages posted by one client 108 are distributed over the distributed database to one or more other clients 108 which may be referred to as "subscribers".

Messages, such as instant messages, are generally grouped together in "conversations" or "message store" between various clients 108. Clients 108 that receive messages posted to a message store may be referred to as "subscribers" such that, if any of the clients 108 of a message store posts a message to that message store, all of the other client 108 subscribers will receive a copy of the message. Messages of a message store received by a client 108 may be displayed on a display screen (not shown) of the client 108. The messages of the message store may be displayed in a consolidated message store in which the messages of the message store are displayed together with other message of different message types including, for example, messages related to instant messaging, social networks, short message service (SMS), and email.

Although the present disclosure describes the distributed database system 100 in the context of instant messaging, the subject matter of the present disclosure is applicable to any sequence of messages sent over a distributed database system 100, and in which data posted to the distributed database system 100 in one geographical region is desirably available in other geographical regions, which may be separated by large distances, at the same time and in the same order. Examples of such situations include financial transactions such as money transfers, emails, computer system message passing, work queues, or any sequenced items passed from one endpoint to another or fanned out from one or more endpoint to many other endpoints. The subject matter of the present disclosure may be incorporated as part of a messaging as a service implementation, or any implementation in which realtime capability is desired.

In an example, if clientA 108a posts a message to a message store to which clientB 108b is a subscriber. ClientA 108a sends the message to the server 106a that the clientA 108a is connected to. The server 106a will write the message to the database 102a that it is connected to, which in turn will propagate the message through the network 104 to the other databases 102b-102N. The server 106a will also send the message to the other servers 106b-106M that the server 106a is connected to, which in turn will send the message to the other servers 106b-106M they are connected to, and so on. In this way, the message propagates through the distributed database system 100 and eventually reaches server 106c which may push the message to clientB 108b, or may be pulled from the server 106c by clientB 108b.

Messages are assigned message identifiers (ID) when they are posted to the distributed database system 100. The assigned message IDs are typically strictly increasing identifiers such that messages are assigned identifiers in the order that the messages are posted to the distributed database system 100. Strictly increasing message IDs have the advantage that, when considering two or more messages, the message with the largest message ID will be the newest message, and the message with the smallest message ID is the oldest message.

However, one issue is that a particular server 106a-106M does not know whether an incoming message is the next message in the sequence after the last known message in that message store, or if there are other intermediary messages that are "in flight" at the time that the message arrives. Further, because the message IDs are strictly increasing globally across the distributed database, the messages of a particular message store may not have message IDs that are contiguous. In an example, messages with message IDs=1, 3, and 5 are posted to a first message store and messages with message IDs=2, 4, and 6 are posted to a second message store. In this example, if a server 106 receives the message with message ID=5 for the first message store after receiving the messages with message IDs=1 and 3, the server 106 may not initially be certain whether message ID=5 is the next message after message ID=3, or if there is a message ID=4 that has been posted to the first message store, but that has not yet arrived at the server because it is still propagating through the distributed database system 100.

In order to handle this uncertainty, the distributed database system 100 utilize what is referred to as "eventual consistency" in which a server 106 can be confident that any given message store is complete and up to date up to a certain point, which is referred to herein as the "server bookmark". In other words, a server 106 knows all of the messages in the message store up to and including the server bookmark, with no gaps. The server bookmark may be, for example, the message ID of a message up to which the server 106 has confidence in the completeness of the message store.

A server 106 may advance its server bookmark based on a global server bookmark value of the distributed database system 100. The global server bookmark value may be set whenever a global quorum is achieved, which is when all of the databases 102a-102N and the servers 106a-106M are in agreement regarding the state of the message store. When a server 106 becomes aware that it has confidence up to a new message ID position, it sets its server bookmark to that value. A server 106 may maintain a separate server bookmark for each message store, or may utilize a single global server bookmark for all message stores. The description set out in the present disclosure is not affected by the servers 106a-106M utilizing separate server bookmarks for each message store or utilizing a global server bookmark for all message stores.

Although reaching a global quorum in an eventual consistency is generally fairly quick (e.g., sub-second time range), reaching a global quorum can take much longer in certain circumstances such as, for example, if the connection between some of the servers 106a-106M or the databases 102a-102N, or both, are lost. Despite the speed of reaching global quorum under normal circumstances, it is preferable for messages to be received at clients 108 when they are received rather than waiting for global quorum to be achieved. Therefore, typically a server 106 will push a message to the clients 108 that are connected to the server 106 and that are subscribers to the message store to which the message is associated, even if that message comes after the server bookmark the server's 106 server bookmark. This is referred to herein as "online messaging".

Typically, a client 108 stores the messages they receive in a local memory (not shown) of the client 108 such that each client 108 has a local store of each message store to which that client 108 subscribes. In the embodiments described herein, the clients 108 maintain their own confidence value, similar to the server bookmark, that represents a point in the version of the message store maintained at the client 108 up to and including which point the client 108 is confident that the message store at the client 108 is complete. The confidence value maintained by the client 108 is referred to herein as the "client bookmark".

The client 108 may also maintain a maximum message ID for each message store to which the client 108 subscribes. The maximum message ID is the message ID of the most recent message associated with the message store that the client 108 has received. In practice, when the client 108 is online, messages will be sent to the client 108 by the server 106 as the server 106 receives them via online messaging, even if the message is beyond the server bookmark. As a new message is received by the client 108, the client updates the maximum messages value with the message ID of the new message.

Client bookmarks may have a timestamp associated with them. The timestamp is an indication of the time at which the current client bookmark value was reached. As described below, the timestamp may be utilized to determine when a client bookmark has become stale and should be refreshed by performing, for example, a sync request with the server 106 to which the client 108 is connected. The client bookmark may be considered "stale" when a predetermined time period has elapsed since the current client bookmark's timestamp.

In general, when a client 108 first subscribes to a message store, it may set the client bookmark for that message store to an empty string, i.e., 0. As messages associated with the message store are pulled from the servers 106 by the client 108, the client bookmark may be advanced based on the information received from a server 106, which information is included within messages sent by the server 106 to the client 108, such as the pull response and sync response messages sent by the server 106. However, a client 108 may only move the client bookmark position forward when the client is confident that it has pulled all of the messages of the message store between its old bookmark position and new bookmark position.

As will be described in more detail below, the client bookmark can only be advanced up to the server bookmark that is received from a server 106 to which the client 108 is connected. The maximum message ID may be greater than the client bookmark. For example, the largest message ID that is received at the client may be further advanced that the server confidence, such as messages received by the client by online messaging before the server has reached confidence that there are no messages in flight before that message.

Figure 2A:
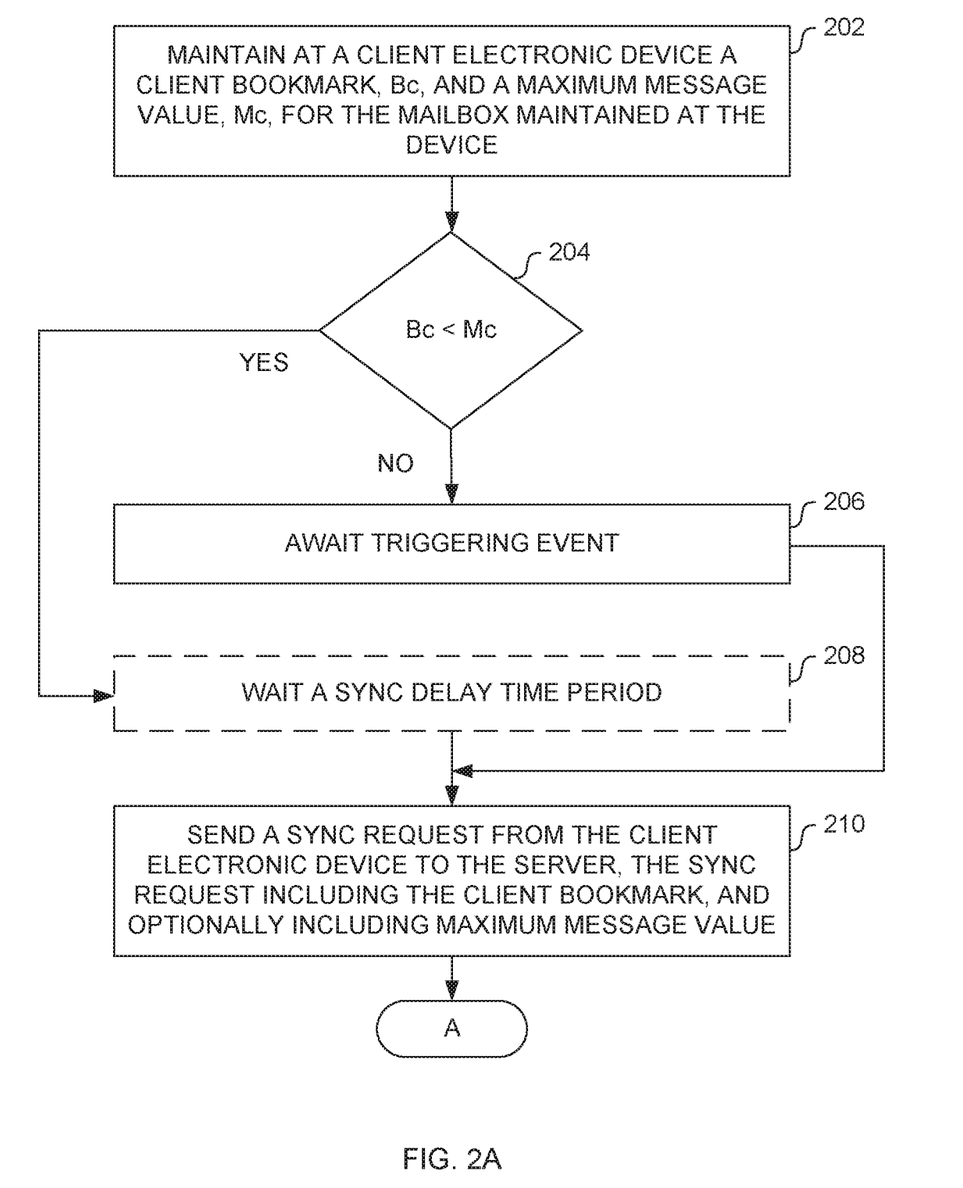
FIG. 2A shows a first portion of a flow chart illustrating a method for maintaining a message store at a client electronic device in accordance with the disclosure and FIG. 2B shows a second portion that continues from the first portion of the flow chart of FIG. 2A.
Figure 2B:
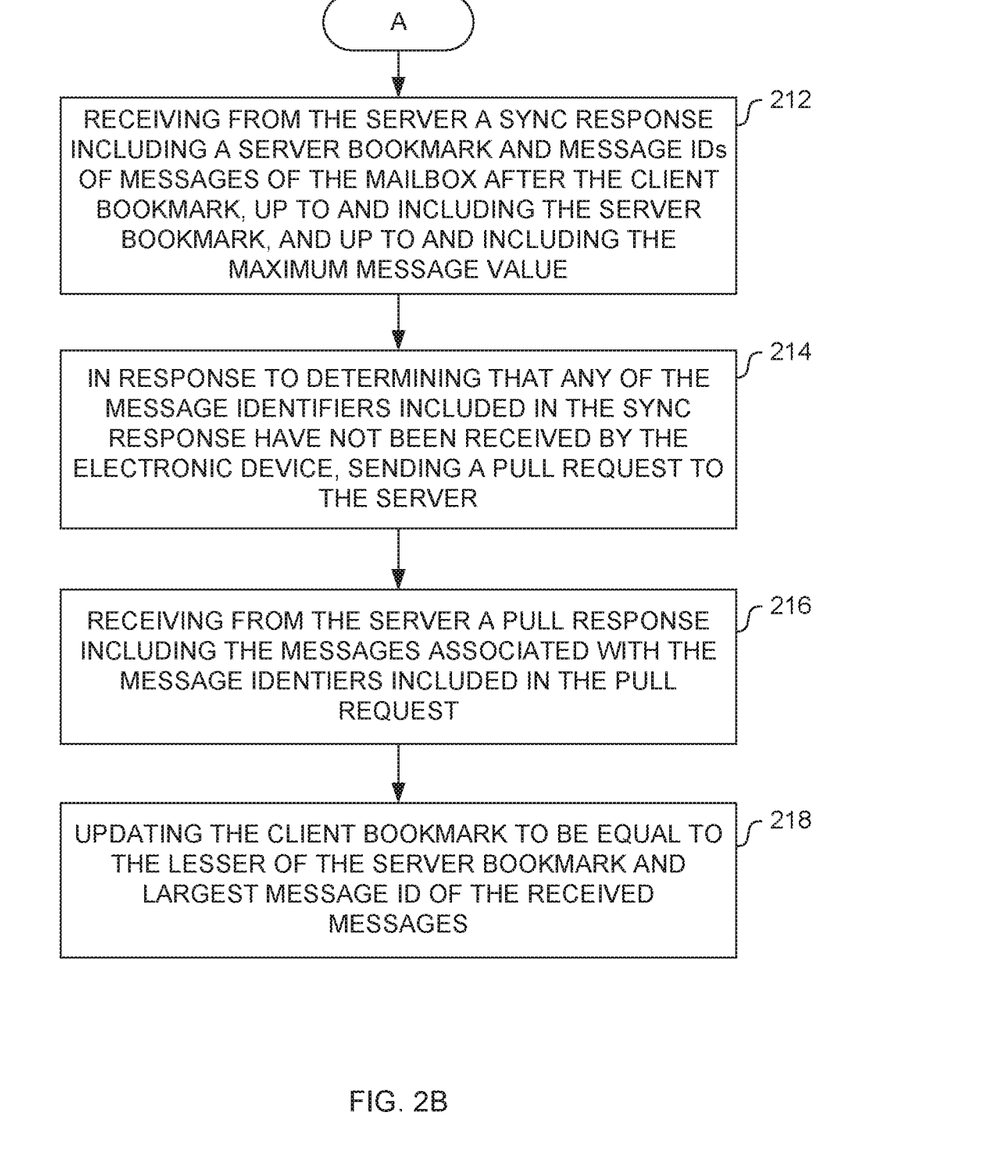

Referring now to FIGS. 2A and 2B, a flow chart illustrating a method for maintaining a message store at a client electronic device, such as clients 108 described above, is shown. The method shown in FIGS. 2A and 2B may be performed by, for example, a processor of the client electronic device that performs instructions stored in a memory of the client electronic device.

At 202, the client electronic device maintains a client bookmark, Bc, for the message store that indicates a point in the message store up to and including which the client electronic device is confident that the messages of the message store received at the client electronic device are complete. The client electronic device also maintains a maximum message ID, Mc, for the message store. The client bookmark and maximum message ID may be maintained by storing these values in, for example, a memory of the client electronic device.

At 204, a determination is made whether the client bookmark is less than the maximum message ID, Mc. If the determination at 204 is "NO", the client bookmark is greater than or equal to the maximum message ID and the message store is in a state of confidence because the client can be certain that there are no gaps in the messages in the message store maintained at the client electronic device up to the maximum message ID. In this case, the process moves to 206 in which client electronic device waits for a further triggering event before taking further action. The triggering event may be, for example, the expiration of a predetermined time period from a timestamp of the current client bookmark. In another example, the triggering event may be, for example, the client electronic device disconnecting from a server and subsequently reconnecting to the server at a later time. Another triggering event may be when a client posts a message.

If the determination at 204 is "YES", the client bookmark is less than the maximum message ID and the message store is in a state of non-confidence. This happens when messages having message IDs greater than the client bookmark Bc are received by the client electronic device via, for example, online messaging or through pulls from the server. In this case, the client electronic device cannot be certain whether there are additional messages between the client bookmark and the maximum message ID that the client has not yet received, for the reasons described above.

When the message store is determined to be in a state of non-confidence, i.e., "YES" at 204, or after the occurrence of a triggering event at 206, the process proceeds to 210 and a sync request is sent from the client electronic device to the server. The sync request includes the client bookmark, which the server can then use to determine what messages to include in the sync response that the server sends back to the client electronic device. The sync request may optionally include the maximum message ID as well. For example, the sync request may include the maximum message ID when the sync request is sent in response a trigger event of the client electronic device has recently connecting to a server after being disconnected for a period of time.

Optionally, after a client electronic device determines at 204 it is in a state of non-confidence, a sync delay time period may be waited at 208 before sending the sync response at 210. The sync delay time period is waited so that client electronic device does not send a sync immediately upon going into a state of non-confidence due to, for example, receiving a message via online messaging. Because servers typically push new messages to the client electronic devices immediately, even if the message is beyond the server's bookmark, the server may not have advanced its server bookmark if a sync response is sent immediately upon receiving the new message. The sync delay time period is desirably short enough that further messages are not delayed in being received by the client device, but long enough to vie the server time to advance its own server bookmark before the sync response is sent.

The length of the sync delay time period may be a predetermined value that is stored at the electronic device, or may be a value that is communicated to the client electronic device by the server. The length of the sync delay time period may be based on, for example, a percentage of time it takes to reach eventual consistency after entering in a state of non-confidence. The length of the sync delay time period may be determined, for example, based on measurements performed by the server on the length of time the server takes to reach eventual consistency. These measurements may be performed periodically or continuously. The value of the sync delay time period may be, for example, updated over time by the server. The value of the sync delay period may be incorporated into messaging sent from the server to the client electronic device, such sync and pull responses, in order to reduce signalling required.

The sync delay time period value may be adjusted by the client electronic device in certain circumstances. For example, the client electronic device may set the sync delay time period value to zero if a previously received server bookmark is determined to be greater than the current client bookmark and the client has received messages with a message ID that is greater than the client bookmark and less than or equal to the server bookmark such that the sync request is sent immediately upon the client electronic device transitioning into a state of non-confidence. In this case, the client electronic device sending a sync request before the server's confidence has advanced is not a concern because the client electronic device knows that the server has greater confidence than the client does and the client knows of at least one message between the client and server bookmarks that the client wants to reconcile.

After the sync request is sent at 210, the client electronic device receives from the server a sync response at 212. The sync response includes the message IDs of the messages of the message store that are after the client bookmark and up to and including the server bookmark. If the sync request sent at 210 included the optional maximum message ID as described above, then the message IDs included in the sync response will also be constrained to be up to and including the maximum message ID. In the case in which the server bookmark is not further ahead of the client bookmark, the sync response will include an empty list of message IDs.

Thus, based on the bookmark and the maximum message ID included in the sync request sent at 210, the sync response received at 212 will contain no message IDs when the bookmark is greater than or equal to the maximum message ID, and if maximum message ID is greater than the client bookmark the sync response will contain the list of message IDs that the server has confidence in that are past bookmark but not beyond the maximum message ID.

Constraining the message IDs in the sync response sent by the server ensures that the server is only sending message IDs that the client electronic device is likely to be interested in and that will enable the client electronic device to move up its client bookmark. By so constraining the message IDs that are included in the sync response sent by the server, the overall efficiency of the sync process is improved compared to the case in which no client bookmark is included in the sync request, in which case the server would not know how complete the client's message store is and would have to include all of the message IDs of message store up to the server bookmark.

Although the sync response sent at 212 send in response does not include message IDs that are beyond the server bookmark and the maximum message ID, the sync response may optionally include a nextMessageID that indicates to the client that the server is aware of further messages that are beyond the client's maximum message ID. In an example, the nextMessageID is included in the sync response only when the sync request includes the maximum message ID and the server is aware of additional messages that exceed the maximum message ID, whether or not the server has confidence in those messages or not. In response to receiving a nextMessageID in the sync response, the client electronic device may send a pull request beginning at the nextMessageID in order to receive from the server all of the messages that the server knows of beyond the client's current maximum message ID.

At 214, the client electronic device determines whether any of the message IDs included in the sync response have not been previously received by the electronic device. In response to determining that the sync response includes message IDs that the client electronic device has not yet received, the client electronic device sends the server a pull request that includes the determined message IDs. The pull request may include a list of only the message IDs that have not been received by the client electronic device, or may include a range of message between a start ID and an end ID.

Although including a range of message IDs in the pull request may duplicate the transmission by the server of messages that the client has already received, requesting a range may be more efficient than providing a list of separate message IDs in certain circumstances. For example, the overhead involved in data retrieval and transmission of messages may be outweighed by the overhead required to perform a query to get a particular individual message from the message store unless a significantly large range of message IDs is requested.

In response to the pull request sent at 214, the client electronic device receives a pull response from the server that includes the requested messages at 216. After receiving the pulled messages, the client electronic device may update its client bookmark for the message store to the lesser of the server book and the largest message ID of the messages received during the pull. Because the sync response only includes messages that are beyond the client bookmark, and less than the server bookmark, the client electronic device has confidence that those received messages are contiguous with the messages that the client electronic device previously received. Further the maximum message ID is updated to equal the largest message ID that was received during the requested pull.

In some cases, the pull response received at 216 may include more than one pull response, which each pull response includes a subset of the messages associated with the message IDs included in the pull request sent to the server at 214. For example, the number of messages that can be included in a single pull response may be limited. In such cases, the pull response at 216 may include the number of messages up to the limit as well as a nextMessageID with the message ID of the next message in the set of messages requested in the pull request. In response, the client electronic device may send a subsequent pull request to the server requesting a pull from the nextMessageID value received in the previous pull response. This process may be repeated until all of the messages associated with the message IDs included in the pull request are received by the client.

After the requested messages are received at 216, the client will either be in state of confidence, with the updated client bookmark being set equal to the updated maximum message ID, or in a state of non-confidence in which the updated client bookmark is smaller than the updated maximum message ID. The client may be in state of non-confidence if, for example, the client electronic device requested a pull from a NextMessageID that was included in the sync response received at 212, as described above.

When the client is in a state of confidence, the process may return to 206 and a next triggering event is waited for. When the client is in a state of non-confidence, the process may proceed back to 208 by restarting the optional sync delay timer and sending a further sync request at 210.

Although the above described method describes the client only sending a pull request in response to a sync request, in other embodiments a client electronic device may send a pull request that is not in response to a sync response. For example, when a client electronic device first subscribes to a message store, or restores a message store for which the data was lost at the client electronic device, the client electronic device may set the client bookmark and the maximum message ID to an empty string, i.e., zero, and issue a pull from the empty string. In response the server sends a pull response, or multiple pull responses as described above, that include all of the messages of the message store that the server is aware of. After receiving the messages, the client electronic device updates its maximum message ID the largest message ID received for the message store and updates its client bookmark to the lesser of the server bookmark and the updated maximum message ID. In another example, the client electronic device may send a pull request to re-fetch content for an application-specific reason that may be unrelated to synchronizing the message store with the server.

Further, the above described example method does not describe the client electronic device posting messages to the distributed database. When a user posts a message by sending the message to the server, the server sends the client a post response that includes the message ID for the posted message. If the message ID of the posted message is greater than the client's current maximum message ID, the client updates the maximum message ID to the message ID of posted message. Increasing the maximum message ID may result in the client device transitioning into a state of non-confidence, as described above. In which case, the client electronic device may proceed to 208 by restarting the optional sync delay timer and sending a further sync request at 210, as described above.

In some cases, messages may be posted as "online only" meaning that the message is not stored in the server's message store, similar to a message that has been deleted from the message store. However, because client and server attempt to fill gaps in the client's database, the present disclosure is unaffected by situation in which gaps in the server message store are present due to messages posted as "online only" or by messages that are subsequently deleted.

Figure 3:
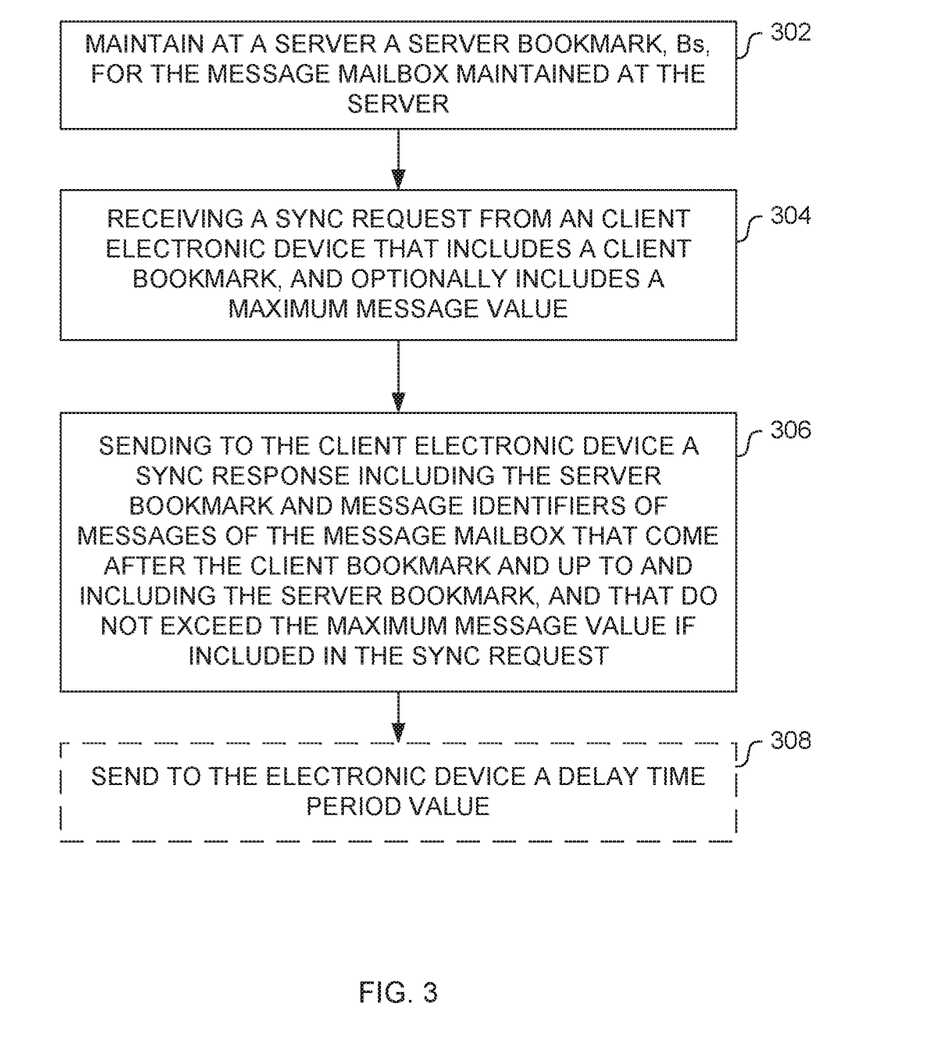
FIG. 3 shows a flow chart illustrating a method for maintaining a message store at a server in accordance with the disclosure.

Referring now to FIG. 3, flow chart showing the above described method for maintaining a message store from the perspective of the server is shown. The method may be performed by, for example, a processor of the server that executes instructions stored in a memory of the server.

At 302, the server maintains a server bookmark, Bs, for the message store. The bookmark, Bs, may be maintained at, for example, a memory of the server.

As described above, the server bookmark Bs may be a specific bookmark for the message store, or it may be a global server bookmark for the distributed database that applies to all of the message stores. At 304, the server receives a sync request from a client electronic device that is connected to the server. At 306, the server sends a sync response to the client electronic device. The sync request that is received at 304 and the sync response sent at 306 are substantially similar, respectively, to the sync request at 210 and the sync response at 212 previously described above with reference to FIGS. 2A and 2B, and therefore are not further described here to avoid repetition. In response to the sync response sent at 306, the server may receive pull requests which the server may respond to with pull responses, as described above with reference to 214 and 216 of FIGS. 2A and 2B.

At 308, the server optionally sends a delay time period value to client electronic device. As disclosed above, the delay time period may be a set value or it may be based on historic measurements of the time for the server to reach eventual consistency. The delay time period value may be incorporated into any messaging that the server sends to the client. As describe above, the delay time period value may be updated over time by the server by sending updated values to the client.

Referring now to FIGS. 4A, 4B, 5, and 6, various illustrative examples of how maintenance of a message store may be performed in accordance with the present disclosure are shown.

Figure 4A:
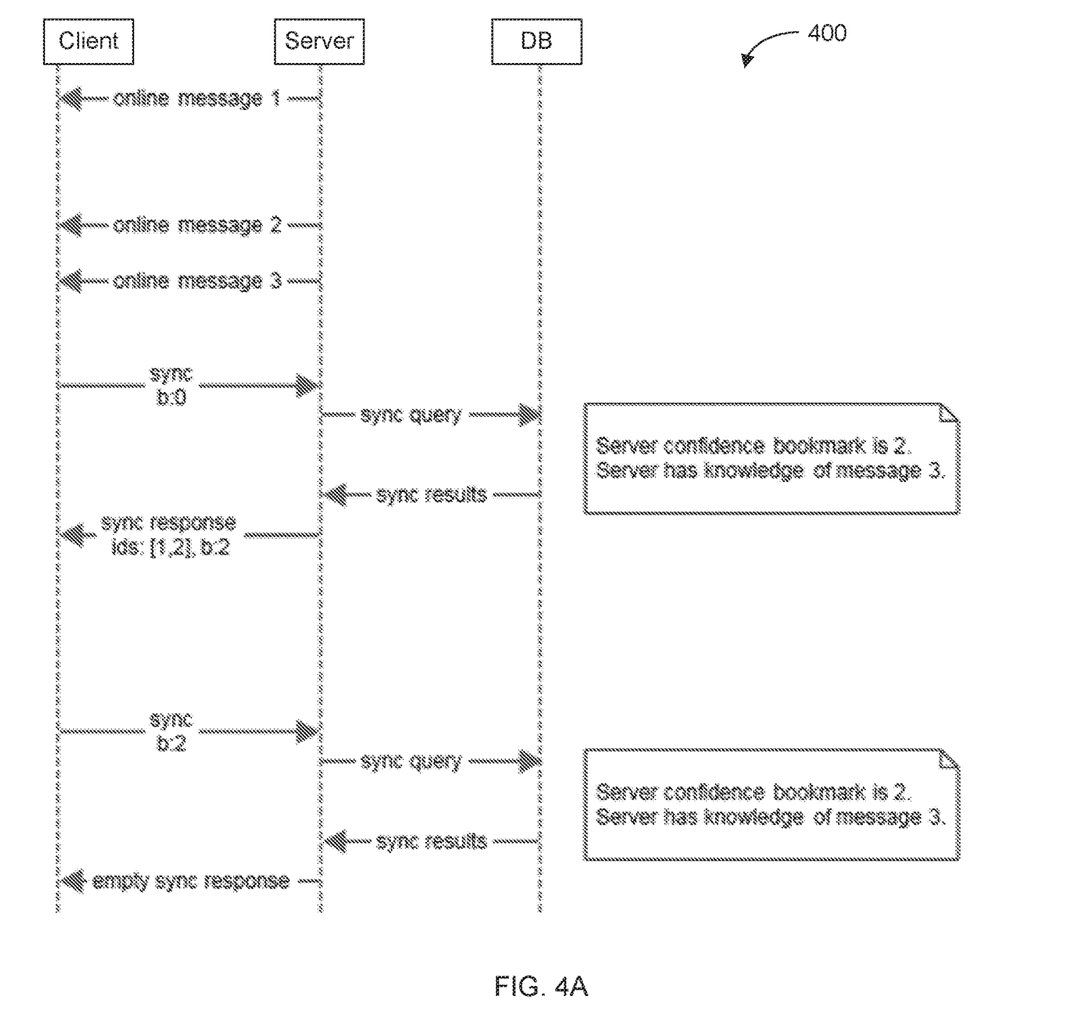
FIG. 4A shows a first portion of a signal flow diagram illustrating an example of a client progressing a client bookmark when the client is in an online state in accordance with the disclosure and FIG. 4B shows a second portion that continue from the first portion of the signal flow diagram of FIG. 4A.
Figure 4B:
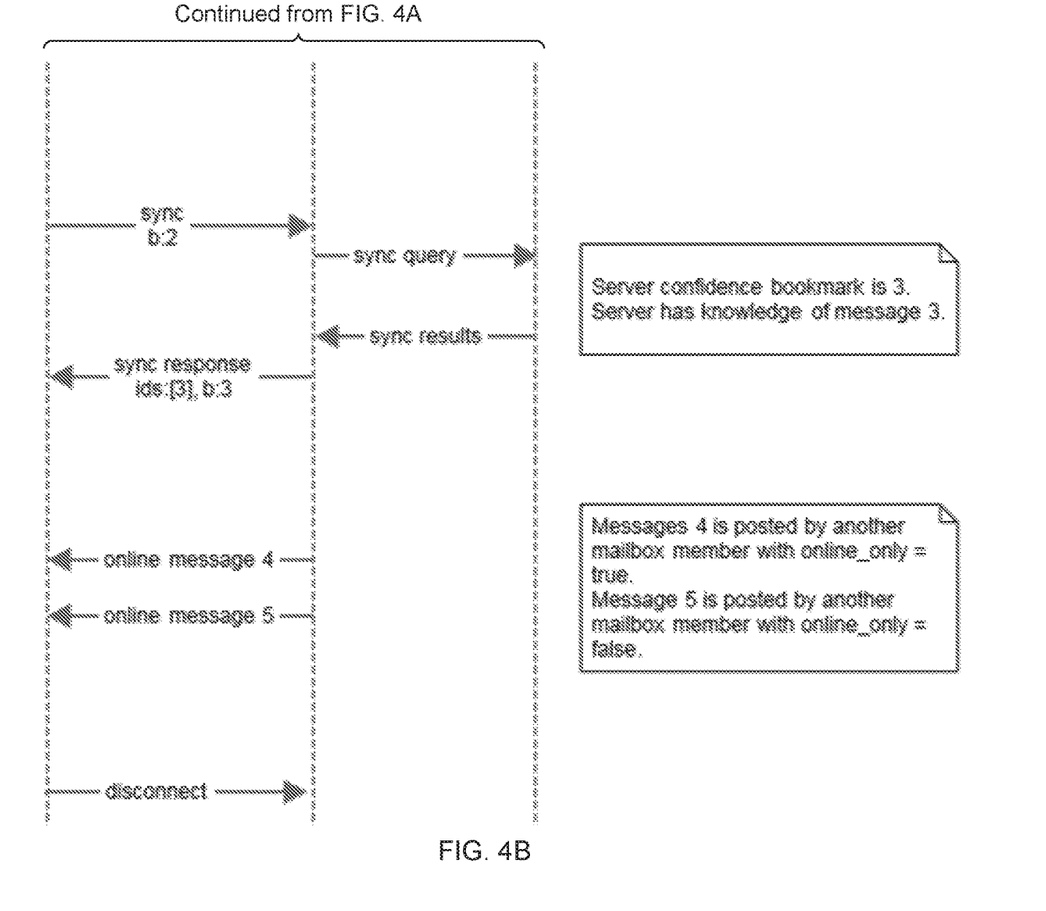

FIGS. 4A and 4B show a signal flow diagram 400 between a client, a server, and a database (DB) that illustrates an example of how a client bookmark may progress for a client that is in online state in which the client is continuously connected to the server. The client, the server, and the DB may be similar to the clients 108, the servers 106, and the databases 102 of the distributed database system 100 described above with reference to FIG. 1.

The example shown in FIGS. 4A and 4B illustrates that the messages may arrive, via online messaging, before confidence is achieved and how the client attempts to move the bookmark to match the end of the record of known messages.

In the shown example, the client starts with an empty message store and, therefore sets the client bookmark b=0. Messages with message ID=1, 2, and 3 arrive via online messaging. The client records the received messages and updates the client's maximum message ID to 3, which is the largest message ID of the received message.

Sometime later, a trigger event, similar to a trigger event described above with reference to 206 of FIG. 2A, occurs and the bookmark does not equal the maximum message ID. The trigger event may be, for example, the expiration of time after a timestamp associated with the client bookmark, as described previously. In response to the triggering event, the client sends to the server a sync request message with the client bookmark b=0. Because the client has not recently reconnected to the server, the sync request does not include the maximum message ID.

At the time that the sync request is sent, the server has achieved a server bookmark=2. The server sends a sync query to the DB and receives back sync results. The server then sends a sync response that includes message IDs=1, 2 (i.e., the message IDs past client bookmark=0 up to the server bookmark=2). Here, because the client has already received message IDs 1 and 2, the client does not pull either of the messages but does update the client bookmark to b=2.

At a later time, another triggering event occurs, such as the refresh timer expiring again with the client bookmark (b=2) not equaling the maximum message ID (max=3). In response, the client sends another sync request to the server which includes the client bookmark (b=2). The server sends a sync query to the DB and receives back sync results. In the example, the server's confidence has not changed and is equal to the client bookmark. In this case, the server responds with an empty sync response (i.e., there are no message IDs that the between that are after the client bookmark and up to and including the server bookmark).

At a later time, the server bookmark advances to 3, followed by another triggering event occurring at the client. The client, which is still in a state of non-confidence, sends a sync request to the server that includes the client bookmark (b=2). The server sends a sync query to the DB and receives back sync results, and sends a sync response to the client with the server bookmark=3 and message ID=3. Because the client has already received message ID=3, the client does not send a pull request. However, the client can now update its client bookmark to b=3, 3 now being the lesser of the server bookmark and the client's maximum message ID.

Afterwards, messages having message IDs=4 and 5 are received by the client from the server via online messaging. In response, the client updates the maximum message ID to max=5. Afterwards, the client disconnects from the server.

Figure 5:
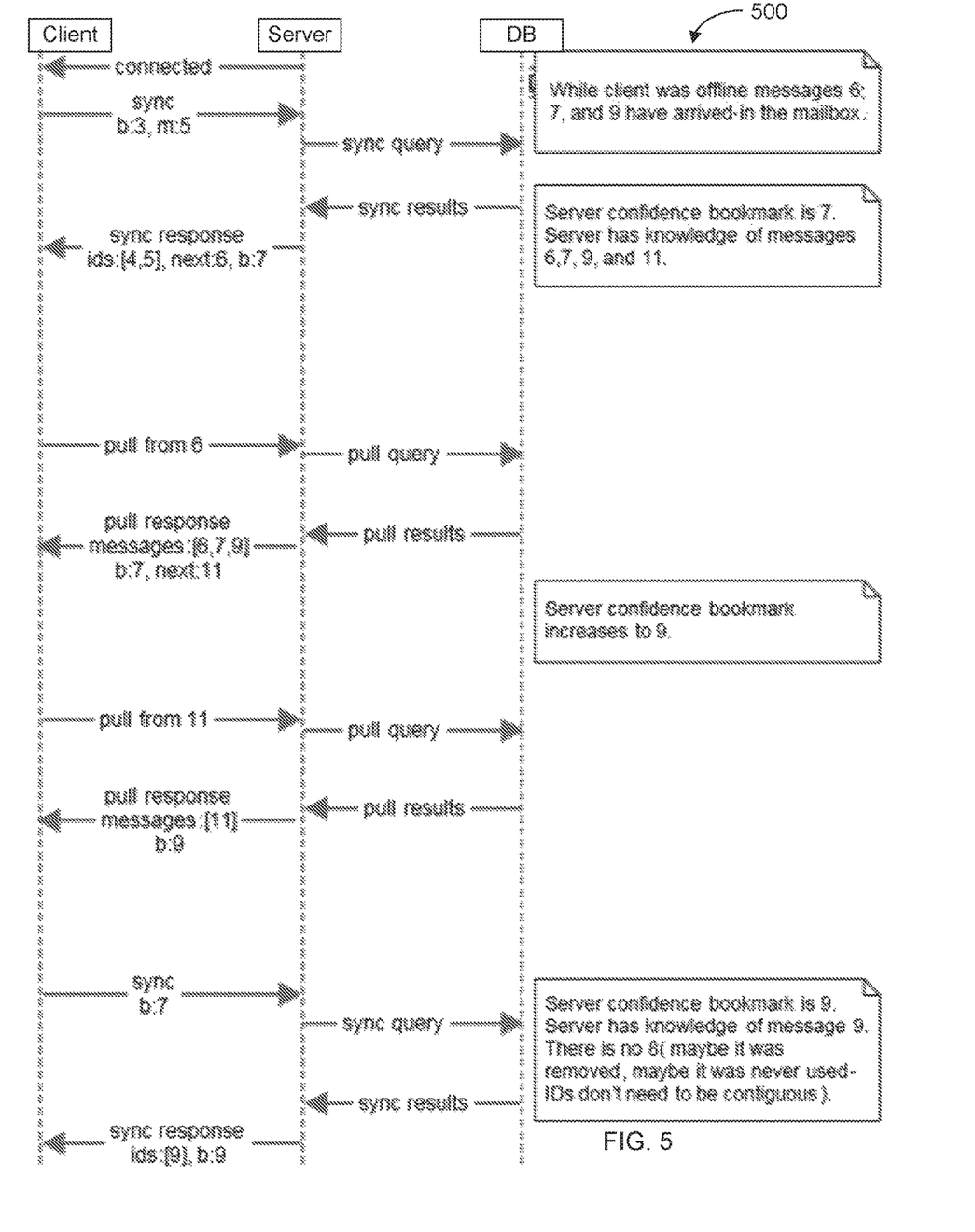
FIG. 5 shows a signal flow diagram illustrating an example of the client updating the client bookmark after the client reconnects to the server in accordance with the disclosure.

FIG. 5 shows a signal flow diagram 500 that continues the end of the example from FIGS. 4A and 4B and illustrates an example of the client updating the client bookmark after the client reconnects to the server after being disconnected for a time period.

In the example shown in FIG. 5, messages with message ID=6, 7, and 9 have been posted to the message store in the time period that the client was disconnected and the server bookmark has advanced to 7.

After reconnecting, the client sends a sync request to the server that includes the client bookmark (b=3) and, because the client has recently reconnected, the client also includes the maximum message ID (max=5) in the sync request. At the time that the sync response is sent, the server has server bookmark=7 and knows about message IDs 6, 7, 9, and 11.

In this example, the server sends a sync query that includes the message IDs between the client's current bookmark (b=3) and the maximum message ID (max=5), i.e., 4 and 5, because the maximum message ID was included in the sync request. Also, because the message request includes the maximum message ID, and the server knows of messages that are after the maximum message ID, the server also includes NextMessageID=6 in the sync response, which is the message ID of the next message after the client's maximum message ID that the server knows about.

Here, the sync response sent from the server lets the client know about both the message IDs beyond the client bookmark that the client did not receive, and the existence of messages beyond the client's maximum message ID.

The server does not know which messages the client has between 3 and 5 based on the information provided in the sync request. There are two reasons the client might need to pull: there could be IDs beyond the client bookmark that the client didn't get; and there could be IDs beyond the client's maximum message ID that the client didn't get. Even though server may not have confidence in all of the message IDs beyond the client's maximum message ID, that is irrelevant because the client generally wants to have messages even if the server is not confident.

Whenever the maximum message ID is included in the sync request, the server will include in the sync response that the client should pull by including a NextMessageID if the server knows any messages at all past client's maximum message ID, even if it lacks confidence in the messages. The client will figure out where to pull from on its own based on the message IDs and server bookmark included in the sync response and the client's client bookmark and maximum message ID.

The client already has messages with message IDs=4, 5 so does not request a pull of these messages. The client updates the client bookmark to b=5, which is the lesser of the maximum message ID and the server bookmark.

The client also sends a pull request from message ID=6 sees based on the nextMessageId=6 field in the sync response. The server sends a pull request to the DB, which sends the pull results back to server. In the example, the server sends a pull response with messages 6, 7, and 9 and includes a nextMessageID=11. The pull response of the server may be limited to 3 messages, which is why the message for message ID=11 was not included. In this case, the nextMessageID=11 indicates to the client that the server is aware of at least one more message in the message store and that the client should pull from 11 to receive those messages.

The client receives the messages 6, 7, and 9 and updates its bookmark to b=7, which is the lesser of the server bookmark and the largest message ID receive by the client. The client then requests to pull from message ID=11.

At the time of this pull request from Message ID=11, the server bookmark has advanced to 9. However, because this pull request at a point that is beyond the server bookmark value, as reported in the previous pull response, the client does not know what the server bookmark is at the time of this current pull request. In such cases, the client will not advance the client bookmark based on the pull response. The server sends a pull request to the DB, which sends the pull results back to server. The server sends a pull response with message 11, and with the updated server bookmark=9.

Now, because the received server bookmark=9 exceeds the client bookmark=7 and the client has received of messages are less than or equal to the server bookmark that the client wants to reconcile, the client may adjust the sync delay time period value to zero in order to immediately send a further sync request. As discussed above, the sync delay time period is not necessary because there is no concern that the server has not yet advanced its confidence and the client is in a state of non-confidence.

Therefore, the client sends a sync request with the client bookmark b=7. The server sends a sync query to the DB, which sends the sync results back to the server. The server sends a sync response to the client with message ID=9 and server bookmark=9. Because the client has already received message ID=9, message ID=9 is not pulled. However, the client bookmark is now updated to b=9, being the lesser of the server bookmark and the maximum message ID.

Figure 6:
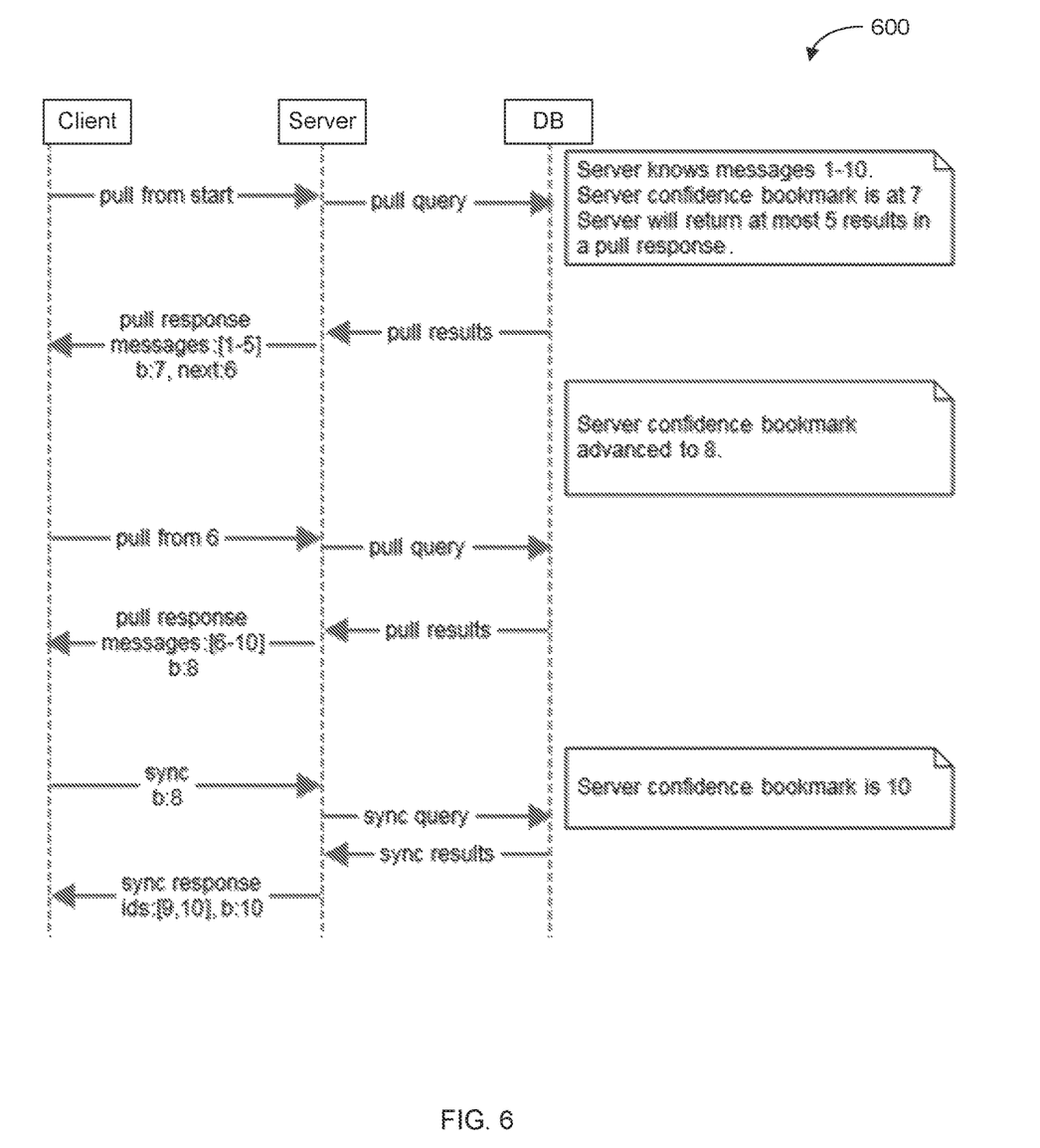
FIG. 6 shows a signal flow diagram illustrating an example of a client synchronizing a message store when the client joins or restores a message store.

FIG. 6 is a signal flow diagram that illustrates an example of a client synchronizing a message store when the client joins or restores a message store. When the client joins or restores a message store, the client has no information regarding the message store and therefore the client bookmark and the maximum message ID are both set to zero. In the example shown, the server knows of messages 1-10 in the message store, and has a server bookmark=7. Further, in the example the server is limited to returning 5 messages in each pull response.

The client begins by sending a pull request starting from message ID=zero to the server. The server sends a pull query to the DB which sends pull results to the server. The server then sends a pull response to the client.

Because the pull response is limited to 5 messages, the pull response contains messages 1-5, the server bookmark=7, and a nextMessageID=6 which tells the client to start pulling from 6 to get more messages. The client processes and saves messages 1-5 and advances the client bookmark to 5. In this example, the client will need to continue to send pull request to the server until the pull response indicates that there are no further messages in order to receive all of the messages the server knows about.

After sending the first pull response, the server bookmark is upgraded to 8 in the example shown, indicating that the server's confidence has includes by 1.

Based on the nextMessageID=6 field in the pull response, the client sends another pull request from message ID=6 to get the next batch of messages in the message store. The server sends the pull request to the DB, which responds by sending the pull results to the server. The server sends a pull response to the client with the next five messages, i.e., messages 6-10, together with the updated server bookmark=8.

Because the server does not know of any more messages past 10 in the message store, the pull response does not include a nextMessageID. The client processes and saves the messages 6-10 and advances the client bookmark to 8.

Now, because the client's maximum message ID is 10, which is greater than the client bookmark (b=8), the client is in a state of non-confidence. The client in the example starts an optional sync delay timer, as disclosed above, to wait for the server to gain more confidence before sending a sync request to the server.

After the sync delay time period expires, the client sends a sync request that includes the client bookmark (b=8), but does not include the maximum message ID because the client has not recently reconnected to the server. At the time that the sync request is sent, the server bookmark has increased to 10, but the server does not know about any new messages.

The server sends a sync query to the DB, which responds by sending the sync results to the server. The server sends a sync response with message IDs=9, 10, which are the message IDs of the messages between the client bookmark and the server bookmark, and the updated server bookmark=10.

The client has already received the messages 9 and 10 so does not send a pull request for these messages, but the client can update the client bookmark to b=10. Now the client bookmark equals the maximum message ID, and therefore the client is in a state of confidence. The message store is now up to date and the client waits for a triggering event as disclosed above.

Embodiments of the present disclosure provide for maintaining a message store at a client electronic device that utilizes a client bookmark in order to perform sync and pull operations more efficiently and reliably. The sync requests of the present disclosure include only two arguments: the client bookmark and the maximum message ID. In most cases the sync request includes only the client bookmark. The server does not have to determine whether a pull is needed unless the sync request includes the maximum message ID.

The clients in the present disclosure need only maintain a single client bookmark value for each message store and the time at which that bookmark was last asserted. The clients issue server requests in response to real events such as, for example, reconnection to a server, receiving online messages, and post success that result in the device resulting in a state of non-confidence. The result in that idle message stores are not rechecked automatically, but can be rechecked on certain events if desired. The present disclosure facilitates reconnect resynchronization requires a maximum of one pull chain per message store even when online messages arrive during resynchronization. The client is also able to proactively look for lost messages on user events or other events. Replaced or deleted messages, as well as messages posted as "online only" are handled by the present disclosure because message IDs that exist in a client message store but not a server message store, and therefore do not appear in sync responses or pull responses, will not confuse clients because the client discloses herein is not affected if the client has more message IDs than the server reports. The client in the present disclosure only attempts to receive message that are in the server's message store that are not in the client's message store.

Further, the servers in the present disclosure do not need to know anything about the state of the message stores at the endpoints connected to the server. The server only has to respond to requests received from the clients.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for maintaining a message store having a plurality of messages, the method comprising:
   maintaining at the electronic device a client bookmark indicating a point in the message store up to which the content of the message store maintained at the electronic device is known to be complete, and a maximum message identifier (ID) indicating the largest message ID of the plurality of messages of the message store that the electronic device has received;
   in response to determining at least one of:
      the client bookmark and the maximum message ID do not match; or
      the electronic device connecting with the server after a period of being disconnected,
   sending to a server a sync request message for the message store, the sync request message including the client bookmark and the maximum message ID; and
   receiving, from the server, a sync response including:
      a server bookmark indicating a point in a message store maintained at the server up to which the content of the message store maintained at the server is known to be complete; and
      message IDs of messages of the message store that come after the client bookmark and before or up to the server bookmark.

2. The method of claim 1, wherein:
   the sync response includes the message IDs of messages in the message store that are up to and including the maximum message ID.

3. The method of claim 2, wherein, when the message store maintained at the server includes a message that follows the message associated with the maximum message ID, the sync response includes a message ID of the message that follows the message associated with the maximum message ID as a next message ID to notify the client that further messages may be requested from the server.

4. The method of claim 1, further comprising:
   in response to determining that any of the message IDs included in the sync response are associated with messages that the electronic device has not received, sending to the server a pull request that includes the message IDs associated with the determined messages that the electronic device has not received; and
   receiving from the server the messages associated with the message IDs included in the pull request.

5. The method of claim 4, wherein the pull request requests a range of message IDs that begins with a smallest message ID of the messages that the electronic device has not received and ends with the message maximum value.

6. The method of claim 4, further comprising, after receiving the messages associated with the message IDs included in the pull request, the electronic device updating the client bookmark to be equal to the lesser of the server bookmark and the largest message ID of the received messages.

7. The method of claim 1, further comprising waiting a delay time period between determining that the client bookmark does not match the maximum message ID and sending the sync request message.

8. The method of claim 7, wherein the delay time period has a length received from the server.

9. The method of claim 8, wherein the delay time period is based on historic measurements of a time for the server to reach eventual consistency.

10. The method of claim 7, further comprising:
    determining that the client bookmark is less than a server bookmark received from the server and that the electronic device has received a message having a message ID greater than the client bookmark and less than or equal to the server bookmark; and
    in response to determining that the client bookmark is less than the server bookmark and that the electronic device has received a message having a message identifier greater than the client bookmark and less than or equal to the server bookmark, setting the delay time period to zero.

11. The method of claim 1, wherein maintaining the client bookmark includes maintaining a timestamp associated with the client bookmark, the method further comprising:
    in response to determining that a refresh time period has elapsed since the timestamp, sending to the server the sync request message for the message store, the sync request message including the client bookmark.

12. An electronic device for maintaining a message store having a plurality of messages, the electronic device comprising:
    a memory;
    a processor in communication with the memory, the processor configured to:
       maintain at the memory a client bookmark indicating a point in the message store up to which the content of the message store maintained in the memory is known to be complete, and a maximum message identifier (ID) indicating the largest message ID of the plurality of messages of the message store that the electronic device has received;
       in response to a determination of at least one of:
          the client bookmark and the maximum message ID do not match;
          or
             the electronic device connecting with the server after a period of being disconnected,
       send to a server a sync request message for the message store, the sync request message including the client bookmark and the maximum message ID; and
       receive, from the server, a sync response including:
          a server bookmark indicating a point in a message store maintained at the server up to which the content of the message store maintained at the server is known to be complete;

message IDs of messages of the message store that come after the client bookmark and before or up to the server bookmark.

13. A non-transitory computer readable medium having stored thereon computer instructions executable by one or more processors of an electronic device to cause the electronic device to:
maintain at the electronic device a client bookmark indicating a point in the message store up to which the content of the message store maintained at the electronic device is known to be complete, and a maximum message identifier (ID) indicating the largest message ID of the plurality of messages of the message store that the electronic device has received;
in response to a determination of at least one of:
the client bookmark and the maximum message ID do not match; or
the electronic device connecting with the server after a period of being disconnected,
send to a server a sync request message for the message store, the sync request message including the client bookmark and the maximum message ID; and
receiving, from the server, a sync response including:
a server bookmark indicating a point in a message store maintained at the server up to which the content of the message store maintained at the server is known to be complete;
message IDs of messages of the message store that come after the client bookmark and before or up to the server bookmark.

14. A method for a server of a distributed database to maintain a message store having a plurality of messages, the method comprising:
maintaining at the server a server bookmark indicating a point in the message store up to which the content of the message store stored in the distributed database is known by the server to be complete;
receiving a sync request from an electronic device the sync request message including a client bookmark indicating a point in a message store maintained at the electronic device up to which the content of the message store maintained at the electronic device is known to be complete and a maximum message ID indicating the largest message ID of the plurality of messages of the message store that the electronic device has received; and
in response to receiving the sync request, sending to the electronic device a sync response including:
the server bookmark; and
message identifiers (IDs) of messages of the message store that are after the client bookmark and up to and including the server bookmark.

15. The method of claim 14, wherein the message IDs included in the sync response do not exceed the maximum message ID.

16. The method of claim 15, wherein, when the message store maintained at the server includes a message that follows the message associated with the maximum message ID, the sync response includes a message ID of the message that follows the message associated with the maximum message ID as a next message ID to notify the client that further messages may be requested from the server.

17. The method of claim 14, further comprising sending to the electronic device a delay time period value that the electronic device waits between the electronic device determining that the client bookmark does not match a maximum message ID and sending the sync request message.

18. The method of claim 17, wherein the delay time period is based on historic measurements of a time for the server to reach eventual consistency.

19. A server for maintaining a message store having a plurality of messages in a distributed database, the server comprising:
a memory;
a processor in communication with the memory, the processor configured to:
maintain at the memory a server bookmark indicating a point in the message store up to which the content of the message store stored in distributed database is known by the server to be complete;
receive a sync request from an electronic device the sync request message including a client bookmark indicating a point in a message store maintained at the electronic device up to which the content of the message store maintained at the electronic device is known to be complete; and
in response to receiving the sync request, send to the electronic device a sync response including:
the server bookmark; and
message identifiers (IDs) of messages of the message store that are after the client bookmark and up to and including the server bookmark.

20. A non-transitory computer readable medium having stored thereon computer instructions executable by one or more processors of a server to cause the server to:
maintain at the server a server bookmark indicating a point in the message store up to which the content of the message store stored in the distributed database is known by the server to be complete;
receive a sync request from an electronic device the sync request message including a client bookmark indicating a point in a message store maintained at the electronic device up to which the content of the message store maintained at the electronic device is known to be complete and a maximum message ID indicating the largest message ID of the plurality of messages of the message store that the electronic device has received; and
in response to receiving the sync request, send to the electronic device a sync response including:
the server bookmark; and
message identifiers (IDs) of messages of the message store that are after the client bookmark and up to and including the server bookmark.

* * * * *